United States Patent [19]
Tetrick et al.

[11] Patent Number: 5,768,585
[45] Date of Patent: Jun. 16, 1998

[54] SYSTEM AND METHOD FOR SYNCHRONIZING MULTIPLE PROCESSORS DURING POWER-ON SELF TESTING

[75] Inventors: R. Scott Tetrick; Raghu Murthi, both of Portland, Oreg.

[73] Assignee: Intel Corporation, Santa Clara, Calif.

[21] Appl. No.: 561,627

[22] Filed: Nov. 21, 1995

[51] Int. Cl.$^6$ ............................................. G06F 9/06
[52] U.S. Cl. ............................................. 395/652
[58] Field of Search ............................ 395/651, 652, 395/653, 200.55, 200.5, 200.51, 200.52, 712

[56] References Cited

U.S. PATENT DOCUMENTS 5,379,431  1/1995  Lemon et al. .................. 395/652
5,450,576  9/1995  Kennedy ........................ 395/652
5,619,716  4/1997  Nonaka et al. ................ 395/200.1
5,649,100  7/1997  Ertel et al. .................... 395/200.1

*Primary Examiner*—Kevin A. Kriess
*Attorney, Agent, or Firm*—Blakely, Sokoloff, Taylor & Zafman

[57] ABSTRACT

A method for synchronizing testing of shared memory contained in a multi-processor computer system after reset. The method involves the steps of performing a wake-up procedure by a bootstrap processor on the other processors. Thus, the other processors can assist in testing the shared memory. Next, respective portions of the shared memory are allocated to each of the processors. Finally, upon completion of testing of its respective portion of the shared memory, each processor sets its unique storage unit synchronizing the processors at completion.

12 Claims, 4 Drawing Sheets

SYSTEM AND METHOD FOR SYNCHRONIZING MULTIPLE PROCESSORS DURING POWER-ON SELF TESTING

BACKGROUND OF THE INVENTION

1. Field of the Invention

The present invention relates to the field of multi-processor computer systems. More specifically, the present invention relates to a system and method for synchronizing multiple processors of a computer system to collectively perform one or more initialization tests after Reset.

2. Description of Art Related to the Invention

Traditionally, a computer system usually comprises a number of integrated circuits critical to its operation. These integrated circuits include at least one processor ("CPU") coupled by communication buses to main memory and an input/output ("I/O") system which allows communication with I/O devices (e.g., a keyboard, display, floppy disk, hard disk drives, and the like). When the computer system is powered on or otherwise emerges from a "Reset" condition, a number of initialization tests are ordinarily performed. Collectively, these initialization tests are commonly referred to as a Power-On Self Test ("POST").

The Power-On Self Test involves a sequence of tasks which are carried out after resetting the computer system but before its operating system ("OS") is fully functional. After Reset, a processor in the computer system begins execution of code which is often referred to as POST code. This POST code is commonly stored in system read-only memory ("ROM") which has been previously programmed as part of a basic input/output system ("BIOS"). Upon executing the POST code, the processor initializes and tests various components of the computer system which are necessary for execution of the operating system including but not limited to the processor itself, main memory and I/O devices such as the keyboard, display and the hard disk from which the operating system usually would be loaded.

In a multi-processor computer system where several processors reside on a common system bus, one of the first initialization steps of the POST is to select one of these processors, called the "bootstrap processor" ("BSP"), to oversee the initialization and perform most of the Power-On Self Test. The selection of the BSP may be dedicated to a particular processor in the computer system, or dynamically selected from among the multiple processors prior to each POST to prevent a single faulty processor from impeding initialization of the entire computer system. Once the BSP has been selected, it (i) verifies its own operation, (ii) tests main memory and I/O devices and (iii) performs any other tasks deemed necessary to bring up the operating system. Thereafter, the remaining processors are allowed to execute code to verify their functionality under control of the BSP.

As described above, a single processor, namely the BSP, has traditionally being used to perform most of the POST, with the remaining processors being tested as one of the final initialization steps before passing control to the operating system. Thus, in the past, the initialization of multi-processor computer systems has been similar to that of uni-processor computer systems, with merely a series of operations added to the final testing stage in order to initialize the additional processors. The reason for adopting this sequential type of testing procedure is that multi-processor computer systems have often evolved from uni-processor system architectures and/or are configured to operate as uni-processor computer systems in some circumstances.

Recently, the storage capacity of main memory provided in computer systems, particularly computer systems having multiple processors, has increased significantly in order to support advanced and more complex software and data manipulation. One of the most time consuming tasks of POST is testing the main memory of the computer system to ensure its functionality so that data is not lost during operation. This memory testing often involves writing to and reading from every storage location in main memory, which usually takes a significant amount of time if main memory has a large storage capacity. For servers and other applications having multi-processor computer systems, it is important for the server to mitigate initialization time requirements by reducing the amount of time required to perform the POST in an effort to achieve high availability time (i.e., the percentage of time the server or system is available for use).

Therefore, it would be advantageous to provide a faster way of initializing a multi-processor computer system. In order for all of the processors, including the BSP, to be used more effectively in performing POST, a method for synchronizing all processors prior to beginning POST and after its completion is essential. Such synchronization also increases the reliability of the POST procedure.

It also would be advantageous to configure the processors to execute the same POST code in order to avoid unnecessarily increasing BIOS storage requirements.

BRIEF SUMMARY OF THE INVENTION

The present invention relates to a system and method for synchronizing testing of shared memory by multiple processors. In order to achieve synchronization, three operations must be performed. First, the processor assigned to be the "bootstrap" processor performs a "wake-up" procedure on the other processors to synchronize their operations prior to performing POST. Next, the shared memory must be partitioned to assign different portions of the shared memory to be tested by different processors. Finally, after each processor has completed its testing, it sets a unique storage unit corresponding solely to that processor to signal that it has completed its assigned tests. Once all processors have completed the test, control can be passed appropriately.

BRIEF DESCRIPTION OF THE DRAWINGS

The features and advantages of the present invention will become apparent from the following detailed description in combination with the figures listed below.

DETAILED DESCRIPTION OF THE INVENTION

A system and method for synchronizing a plurality of processors of a multi-processor architecture which are responsible for testing and configuring memory, I/O devices and other related components during POST is described herein. In the following description, in order to provide a thorough understanding of the present invention, numerous specific details are set forth such as specific technique for synchronizing POST operations for the multi-processor computer system. It will be evident, however, to those skilled in the art that this specific technique provides one of a number of embodiments which can be followed to practice the present invention. In other instances, well known procedures and circuits have not been shown or described in detail in order to avoid unnecessarily obscuring the present invention.

Figure 1:
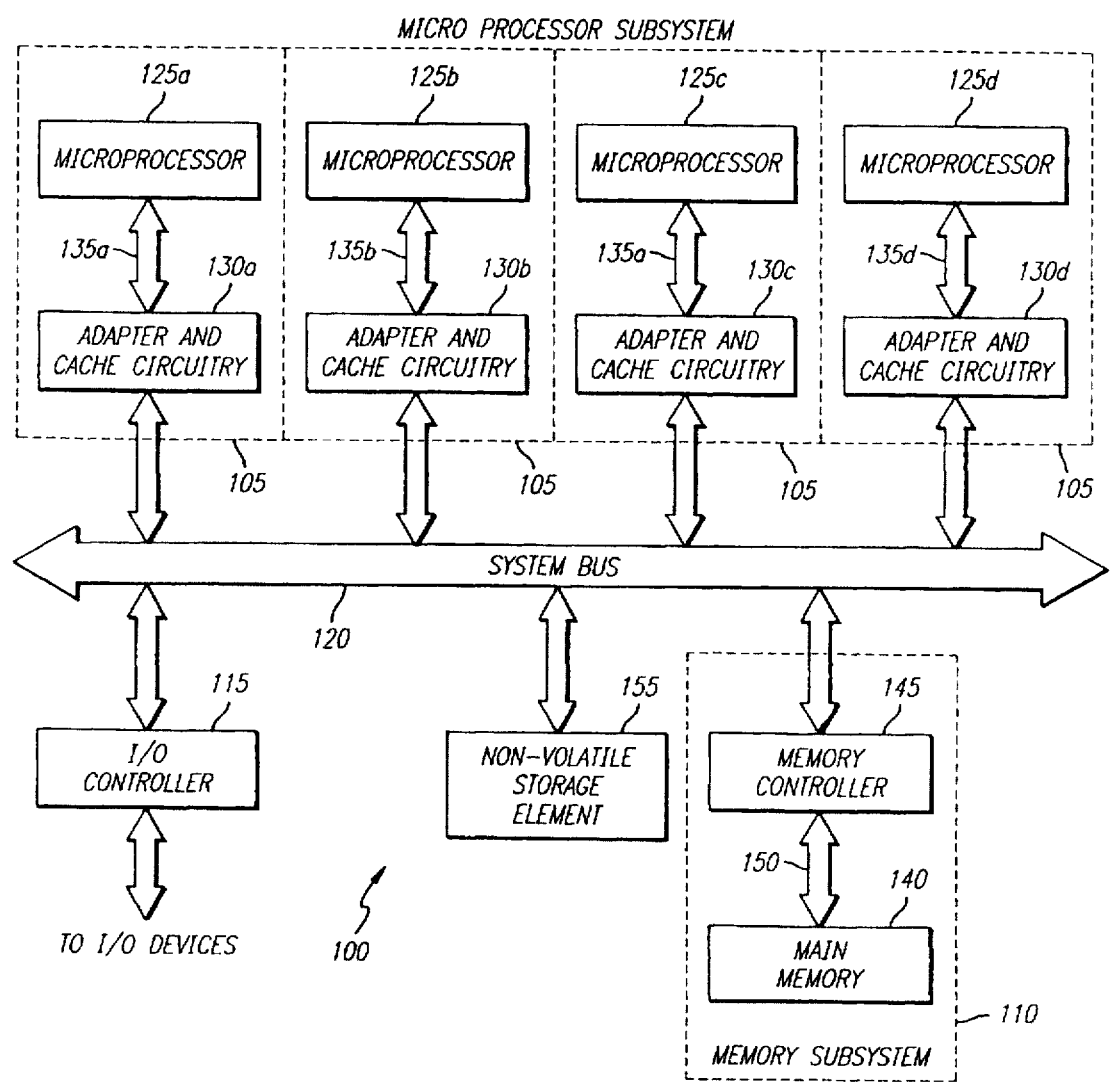
FIG. 1 is a block diagram of a multi-processor computer system.

Typically, the present invention is utilized in an computer system in which multiple microprocessors are coupled to a shared main memory (e.g., random access memory "RAM") through a common system bus as shown in FIG. 1. The computer system 100 comprises a plurality of microprocessor subsystems 105, a memory subsystem 110 and an I/O controller 115, all of which communicate with each other through a common system bus 120. Each of the microprocessor subsystems 105 comprises one or more microprocessors 125a–125d which communicate with corresponding adapter and cache circuitry 130a–130d by way of a local microprocessor bus 135a–135d. The microprocessors 125a–125d can be any microprocessor which is suitable for use in a multi-processing environment including, but not limited to an Intel® Microprocessor Architecture (e.g., x86™ processor, PENTIUM® as well as any future generation processors).

Information (i.e., data, address and/or control signals) is provided from the microprocessors 125a–125d, by way of the local microprocessor buses 135a–135d, to its corresponding adapter and cache circuitry 130a–130d which includes a bus adapter and a second level ("L2") cache (not shown). Each adapter and cache circuitry 130a–130d functions as an interface between its corresponding microprocessor 125a–125d and the system bus 120 to ensure that the microprocessors 125a–125d conform with bus signal protocols of the system bus 120. Additionally, the L2 cache can be provided in each adapter and cache circuitry 130a–130d in order to buffer data access from the memory subsystem 110 during normal operation of the computer system 100. In general, for the purposes of memory testing, the L2 caches in the microprocessor subsystems 105 are disabled.

The I/O controller 115 is utilized to interface the system bus 120 to one or more I/O devices such as a keyboard, a cursor controller (e.g., mouse, track-ball, joystick, touch pad, etc.), display, hard drive, floppy disk drive, and the like. Thus, the I/O controller 115 may provide the connection which allows an operating system to be loaded after complete initialization of the computer system 100.

The memory subsystem 110 contains shared main memory 140 for use by the microprocessor subsystems 105. The main memory 140 is coupled to a memory controller 145 by way of a memory bus 150. The memory controller 145 interfaces the main memory 140 to the system bus 120, to enable data to be retrieved from main memory 140 and placed on the system bus 120, and for data on the system bus 120 to be stored in the main memory 140.

Also, residing on the system bus 120 is a non-volatile storage element 155 which is preprogrammed with POST instructions to be executed by the microprocessors 125a–125d for initializing the computer system 100 after Reset as part of the basic input/output system ("BIOS") for the computer system 100. Alternatively, the non-volatile storage element 155 may be coupled to each of the local microprocessor buses 135a–135d or an auxiliary bus coupled to the I/O controller 115 such as a PCI bus, ISA bus, EISA bus and the like. The nonvolatile storage element 155 may include ROM but preferably includes flash memory (e.g., electrically erasable programmable read only memory "EEPROM") or other types of non-volatile memory (e.g., erasable programmable read only memory "EPROM").

As mentioned, the Power-On Self Test was previously performed by the bootstrap processor ("BSP") while additional microprocessor subsystems were initialized at the end of the process, immediately before passing control to the operating system. According to embodiments of the present invention, the initialization process for a multi-processor computer system synchronizes the testing operations performed by the processors. These testing operations are directed to main memory as well as I/O devices.

Figure 2:
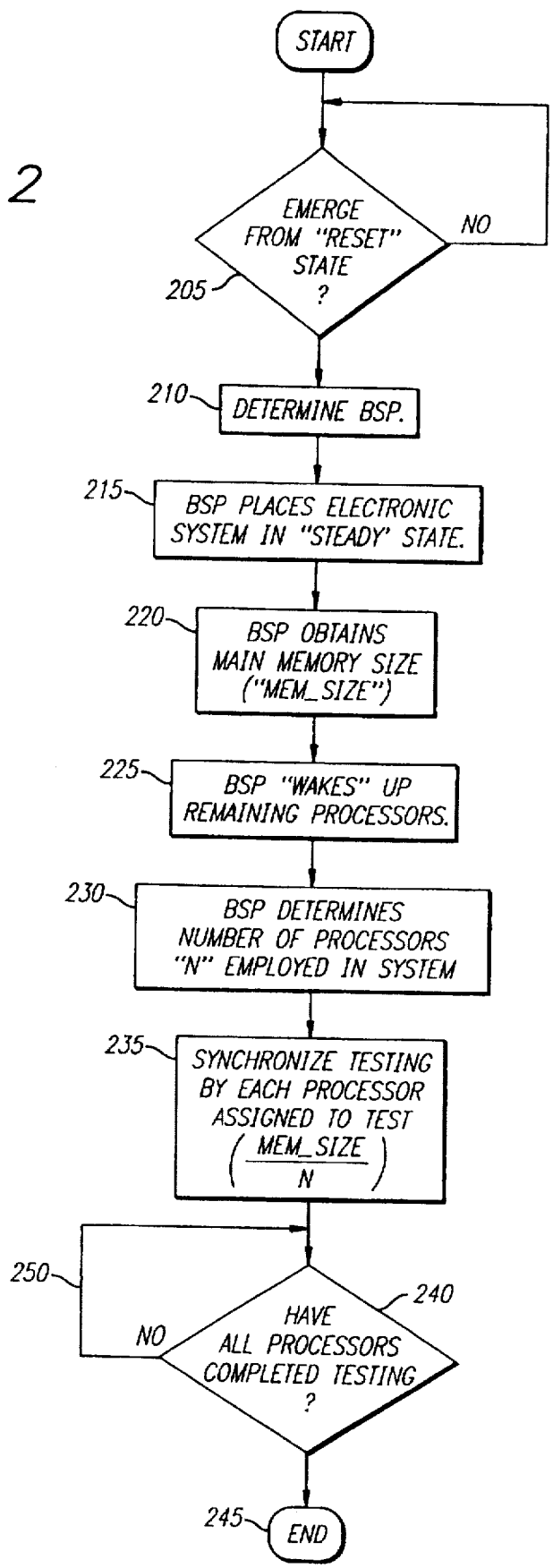
FIG. 2 is a flowchart illustrating the operations of the computer system to synchronize the processors to perform POST.

Referring now to FIG. 2, a flow chart illustrating the steps performed by the computer system of FIG. 1 during POST is shown. The Power-On Self Test begins upon detecting that the computer system has emerged from a "Reset" state (Step 205). There are ordinarily two possible Reset conditions for the computer system, namely a "cold start" and a "warm start". The "cold start" refers to the Reset condition when the system's power is switched on or when a hardware Reset is initiated by a user of the system. A "warm start" refers to the Reset condition following a software Reset instruction which can result from a variety of circumstances. In some instances, the POST procedure for a warm start may slightly differ from the procedure carried out for a cold start, particularly with respect to the testing of memory because, in some situations, a warm start may not require complete memory testing (e.g., restarting the operating system). Thus, for the purposes of the following description, it will be assumed that the Reset condition arises from a cold start, such as the electronic power having been applied to the computer system.

Next, a determination is made as to which of the multiple processors is the bootstrap processor "BSP" (Step 210). One way this is accomplished is for each processor to undergo arbitration. The arbitration may involve each of the processors, uniquely identified by a predetermined number assigned by any well-known hardware strapping option to be in a range of "0" to "N-1" (for "N" processors), initially executing code stored in the non-volatile storage element of FIG. 1 which causes each processor to attempt to access one or more mutually accessible registers or memory storage location in main memory. The first processor to (i) gain access to the register or the memory storage location and (ii) set a particular value therein is selected as the BSP. Each of the remaining processors is configured to detect that a BSP has already been assigned, and execute a halt instruction to stop code execution upon detection. It is contemplated, however, that one of the processors may be permanently designated as the BSP such as by virtue of being in a particular slot in the computer system architecture. In that case, no arbitration is required.

Assuming that microprocessor 125a is assigned as the BSP, this processor then proceeds to perform a series of Power-On Self Tests to place the computer system in a steady operating state (Step 215). These tests include initializing and testing (i) its corresponding bus adapter whether it is providing access to the system bus and (ii) the memory controller whether it is allowing information to be transmitted between main memory and the system bus, etc.

Upon reaching a steady operating state, the BSP signals the memory controller 145 to determine the size of the main memory ("Mem_Size") if allocation of testing duties by the processors requires partitioning of testing responsibilities for main memory among the processors (Step 220).

Thereafter, the BSP sequentially "wakes up" the other processors (microprocessors 125a–125d) and allows the other processors to carry out a self testing procedure to establish their functionality (Step 225). One contemplated technique in which the "wake-up" procedure can be performed would be to place all the remaining processors in a Reset state and release its associated Reset signal during wake-up thereby allowing these processors to execute code normally. A second technique involves inner-processor communications via an Advanced Programmable Interrupt Controller ("APIC") bus in which an Inter-Processor Interrupt is sent from one processor (e.g., BSP) to another processor to wake-up that processor. It is contemplated that there exists other techniques that could be used.

Following the initialization and testing of the non-BSP processors, in Step 230, the BSP is then able to determine the number "N" of operative processors including itself (where "N" is a whole number greater than or equal to "1" and N=4 for the computer system of FIG. 1). Using this information and Mem_Size, main memory can be partitioned and equal memory portions reserved for one of the operative processors for testing purposes. The memory portions may be assigned by the BSP or can be internally calculated by each processor.

After partitioning main memory so that each processor is responsible for testing its reserved portion, the computer system synchronizes memory testing between the various processors (Step 235). However, the same technique may be used to synchronize testing of any component besides memory. In this embodiment, in order to synchronize memory testing, a mutually accessible storage element (e.g., at least one processor register) is implemented preferably in the memory controller of the computer system, although it is contemplated that a predetermined number of bits of main memory could be reserved for this synchronization. The storage element (e.g., one or more registers) reserves a "test_complete" flag, at least one bit wide, for each processor in the computer system regardless of the processor is present or operative within the computer system.

If a processor is not present or inoperative, the test_complete flag in the storage element is always set. The BSP then transmits the total number of operative processors ("N") and the memory size ("Mem_Size") to each processor and instructs that processor to begin its testing. Upon completion of its memory test, the processor sets its assigned test_complete flag signifying that it has completed its required portion of the POST. Thereafter, the BSP checks to see whether all the processors have completed its testing (Step 240). If so, the POST has ended and control is passed to the operating system (Step 245). If not, the BSP continues to frequently monitor the storage element to check whether all of its test-complete flags have been set (Step 250). It is contemplated that the BSP could set a predetermined amount of time for each processor to complete its test and if the processor did not set its test_complete flag by expiration of the predetermined time period, the BSP would presume that the POST has failed.

Figure 3:
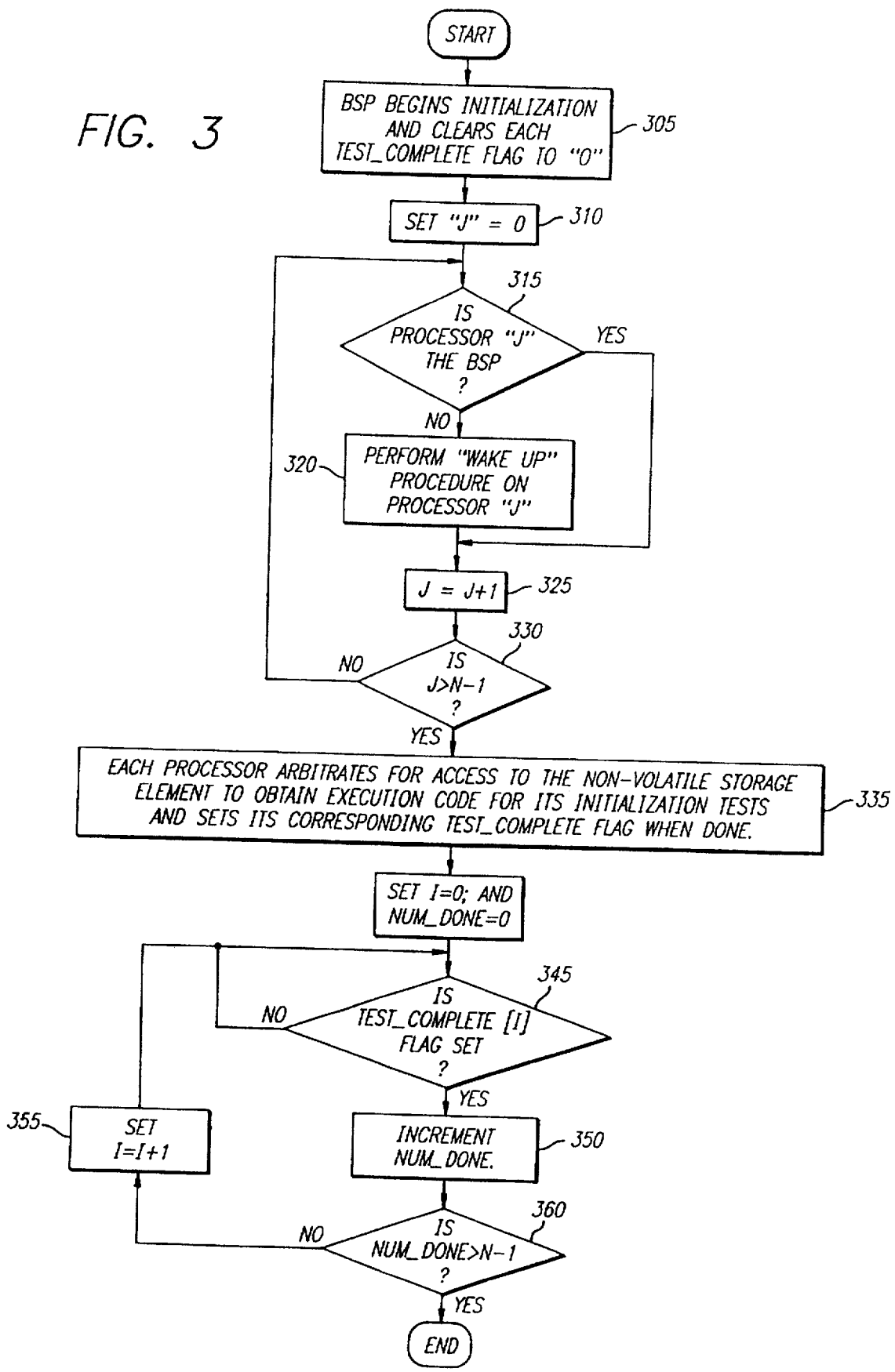
FIG. 3 is a flowchart illustrating the operations of the BSP in performing POST.

Referring now to FIG. 3, the operations of the BSP is shown. First, in Step 305, the BSP begins initialization of the computer system by performing some initialization tests on itself and clears the contents of the storage element to bring the system to a steady operating state and each test_complete flag to a preselected logic value (logic "0"). Thereafter, the BSP performs a wake-up procedure (Steps 310–330) by setting a counting variable "J" equal to one (Step 310) and sequentially accessing each processor (i.e., $j^{th}$ processor), including itself (Step 315), to determine whether the processor requires wake-up (Step 320). A couple alternatives for the wake-up procedure are discussed in FIG. 2. After accessing each processor, the counting variable "J" is incremented so that the wake-up procedure ends when all "N" operative processors are functional (Steps 325 and 330).

Next, the BSP and the other processors arbitrate for access of the system bus in order to retrieve POST code for executing those initialization tests to test the memory portions reserved for the processor awarded control of the system bus. Upon completing its selected Power-On Self Test portion, the $j^{th}$ processor sets its corresponding test_complete flag to signal to the BSP that it is done with its portion of the memory testing (Step 335).

Thereafter, two counting variables such as "I" and "Num_Done" are set to "zero" and "one" respectively, and the BSP checks the storage element to determine whether any of its test_complete flags is deasserted (Steps 340–355). If so, the Power-On Self Test is not complete so the BSP is configured to later poll the Num_Done variable to again check whether all of the processors implemented within the computer system are operational before passing control to the operating system (Step 360). If all of the test_complete flags are asserted and Num_Done=N (Step 365), POST is completed and control is then passed to the operating system.

Figure 4:
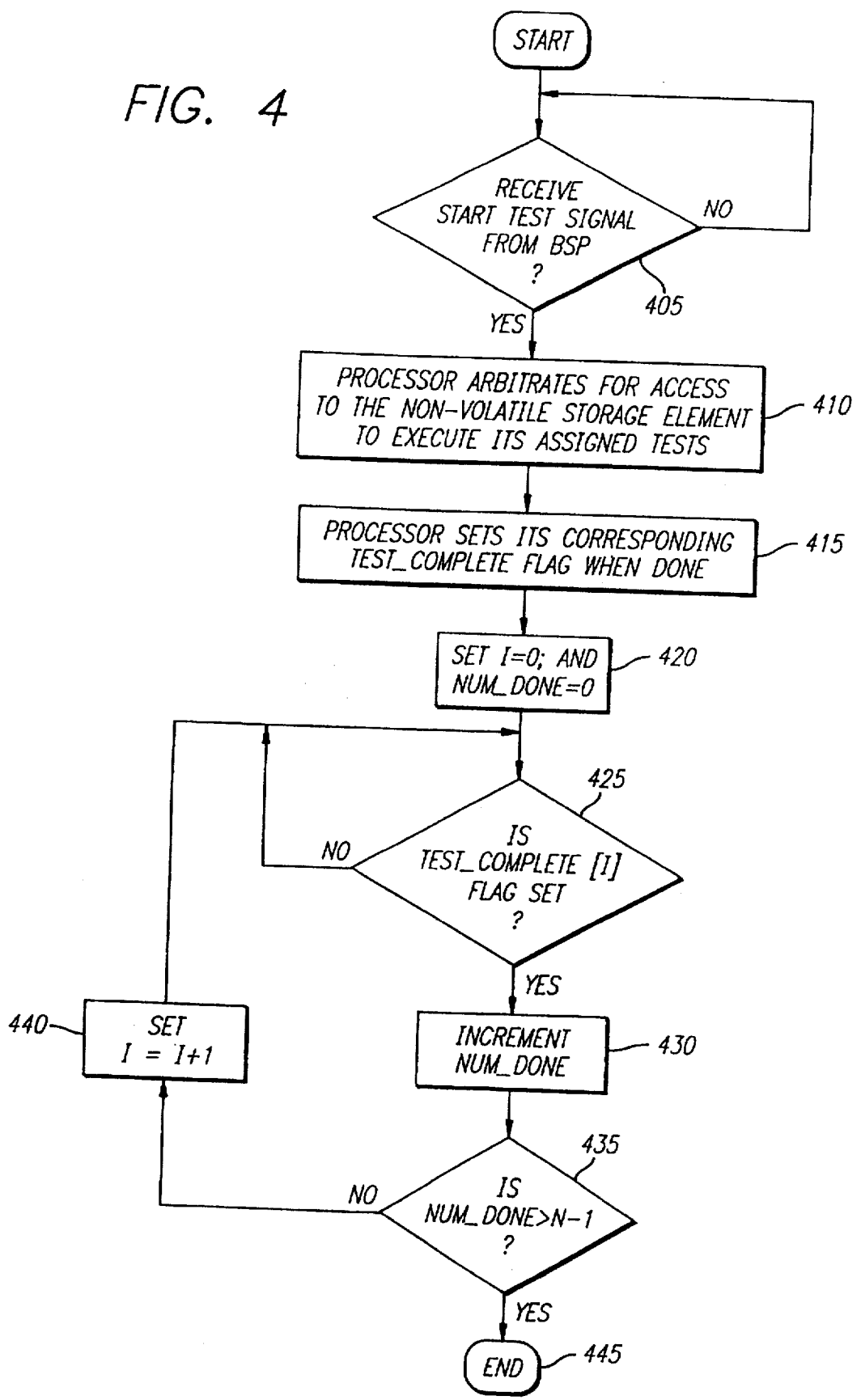
FIG. 4 is an illustrative flowchart showing the operations of the remaining processors performing POST.

Referring now to FIG. 4, the operations of the processors besides the BSP is shown. Each processor awaits a control signal (e.g., Start Test signal) from the BSP indicating that the processor can undergo initialization tests and thereafter perform testing on that portion of main memory of which it is responsible (Step 405–410). Thereafter, the processor sets its test_complete flag to indicate that it is done with testing its reserved memory portion (Step 415). Thereafter, the BSP performs its memory activity testing (Steps 420–445) similar to Steps 340–360 of FIG. 3 to determine that all processors have completed testing its reserved memory portion before passing control of the computer system to the operating system.

The present invention described herein may be designed in many different methods using many different configurations. While the present invention has been described in terms of various embodiments, other embodiments may come to mind to those skilled in the art without departing from the spirit and scope of the present invention. Thus, the invention should be measured in terms of the claims which follow.

What is claimed is:

1. In a computer system including a shared memory, a first plurality of processors adapted to access the shared memory and a first storage element, a method for synchronizing testing of the shared memory comprises the steps of:

selecting one of said first plurality of processors as a bootstrap processor;

performing a wake-up procedure by said bootstrap processor on a second plurality of processors to determine how many of the second plurality of processors are operational;

allocating a respective portion of the shared memory targeted for testing to each of the operational processors;

testing of the shared memory by the operational processors in parallel; and setting a unique storage unit within the first storage element by each of the operational processors after completion of testing of its respective portion of the shared memory.

2. The method according to claim 1, wherein said second plurality of processors in combination with said bootstrap processor is equivalent to said first plurality of processors.

3. The method according to claim 1, wherein said wake-up procedure includes the steps of transmitting an inter-processor interrupt signal from said bootstrap processor to each of said second plurality of processors.

4. The method according to claim 1, wherein said wake-up procedure includes the steps of activating a reset signal coupled to each of said second plurality of processors; and deactivating said reset signal thereby synchronizing power-on self testing performed by said second plurality of processors.

5. The method according to claim 1, wherein said allocating step includes the step of communicating from said bootstrap processor to each of said second plurality of processors a respective processor number, data representing a storage size of said shared memory and a number of said operational processors, so as to determine a respective starting address and ending address defining said respective portion of the shared memory.

6. The method according to claim 1, wherein said allocating step includes the step of utilizing said bootstrap processor to determine, for each of said operational processors, a starting address and an ending address defining each respective portion of the shared memory.

7. The method according to claim 1, wherein prior to said setting step, the method further comprises the step of supporting arbitration by said first plurality of processors to obtain test instructions from a second storage element in order to test the shared memory.

8. In a computer system including a shared memory, a plurality of processors adapted to access the shared memory and a first storage element, a method for synchronizing testing of the shared memory comprises the steps of:

performing a wake-up procedure on at least one of the plurality of processors;

determining how many of the plurality of processors are operational;

allocating a different portion of the shared memory to each of the plurality of processors that are operational;

testing the allocated portion of the shared memory in parallel by each of the plurality of processors that are operational; and setting a unique storage unit of the first storage element by each of the plurality of processors that are operational upon completion of testing of its allocated portion of the shared memory.

9. The method according to claim 8, wherein prior to said allocating step, the method further includes the step of initializing one of said plurality of processors as a bootstrap processor.

10. The method according to claim 9, wherein said wake-up procedure includes the step of transmitting an inter-processor interrupt signal from said bootstrap processor to each of said at least one of the plurality of processors.

11. The method according to claim 9, wherein said wake-up procedure includes the steps of activating a reset signal coupled to each of said at least one of the plurality of processors; and deactivating said reset signal thereby synchronizing the testing performed by said plurality of processors.

12. The method according to claim 8, wherein prior to said setting step, the method further comprises the step of supporting arbitration by said plurality of processors to obtain test instructions from a second storage element in order to test the shared memory.

* * * * *